May 3, 1949.　　　　　　　　L. S. WOOD　　　　　　　2,469,321
POWER OPERATED TAIL GATE MECHANISM FOR VEHICLES
Filed May 12, 1947　　　　　　　　　　　　　　　4 Sheets-Sheet 1

INVENTOR.
LOUIS S. WOOD
BY Taylor and Lassagne
ATTORNEYS

May 3, 1949.  L. S. WOOD  2,469,321
POWER OPERATED TAIL GATE MECHANISM FOR VEHICLES
Filed May 12, 1947  4 Sheets-Sheet 2

INVENTOR.
LOUIS S. WOOD
BY
ATTORNEYS

May 3, 1949.　　　　　　　　L. S. WOOD　　　　　　　2,469,321
POWER OPERATED TAIL GATE MECHANISM FOR VEHICLES
Filed May 12, 1947　　　　　　　　　　　　　　　　4 Sheets-Sheet 3

INVENTOR.
LOUIS S. WOOD
BY
Taylor and Lassagne
ATTORNEYS

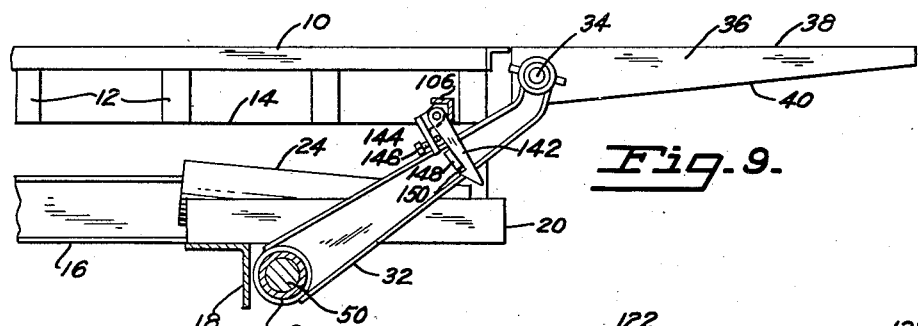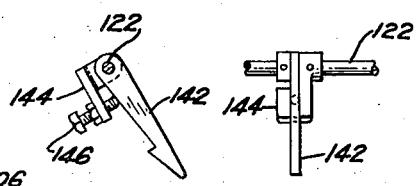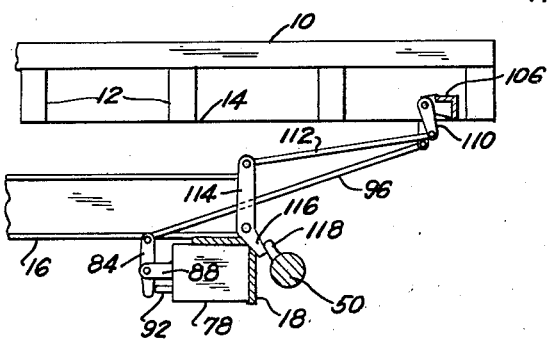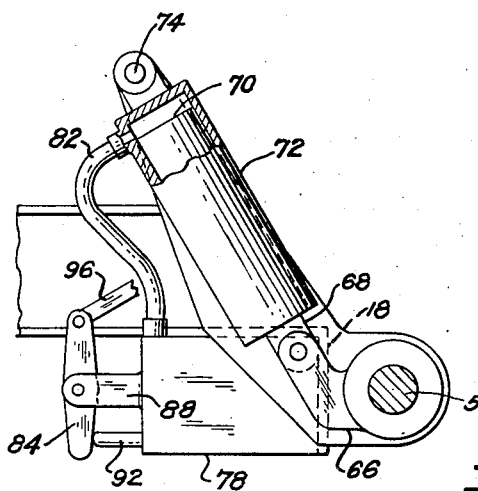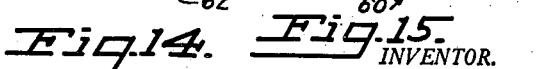

Patented May 3, 1949

2,469,321

UNITED STATES PATENT OFFICE 2,469,321

POWER-OPERATED TAIL GATE MECHANISM FOR VEHICLES

Louis S. Wood, Burlingame, Calif.

Application May 12, 1947, Serial No. 747,564

10 Claims. (Cl. 214—77)

This invention relates to a tail gate mechanism for trucks, and the like, and more particularly to a power operated mechanism of this type whereby the tail gate is adapted to serve as an elevator for raising cargo from ground level to the level of the bed of the truck body.

An object of the invention is to provide an improved operating mechanism for an elevator-type tail gate for a vehicle whereby said gate may be raised from ground level to a position of parallel alignment with the body bed and then to a vertical position to serve as a closure member for the end of the body.

A further object of the invention is to provide an operating mechanism of this character embodying novel means for maintaining substantial parallelism between the ground and the tail gate while the gate is being raised to its position of alignment with the body bed.

Still a further object of the invention is to provide a tail gate having convergent surfaces adapting gate to use as an inclined rampway when at ground level, and to further provide novel means to shift the gate in its upward platform-like travel so that the upper surface of the gate is parallel to the body bed and in alignment therewith at the end of such travel.

And yet a further object of the invention is to provide a tail gate and operating mechanism of this character as a compact unit, thus adapting the structure for ready installation with diverse types of truck bodies.

Another object of the invention is to provide a novel and efficient control system for a tail gate assembly of this character.

Another object of the invention is to provide a simple and efficient safety latch device to prevent an accidental dropping of the tail gate.

Other objects and advantages of the invention will be apparent from the following description taken in conjunction with the drawings forming part of this specification, and in which:

Figure 5 is an enlarged view in elevation, partly in section, of a portion of the structure shown in Figure 1;

Figure 6 is a view in elevation of the essentials of the mechanism for raising the tail gate to a vertical position;

Figure 7 is a view in elevation of a portion of the control system of Figure 4;

Figure 8 is a view in elevation of portions of the gate lifting mechanism and the control system;

Figure 9 is a view in elevation of the safety catch structure associated with the gate lifting arms;

Figures 10 and 11 are side and front elevations, respectively, of the safety catch structure of Figure 9;

Figure 1:
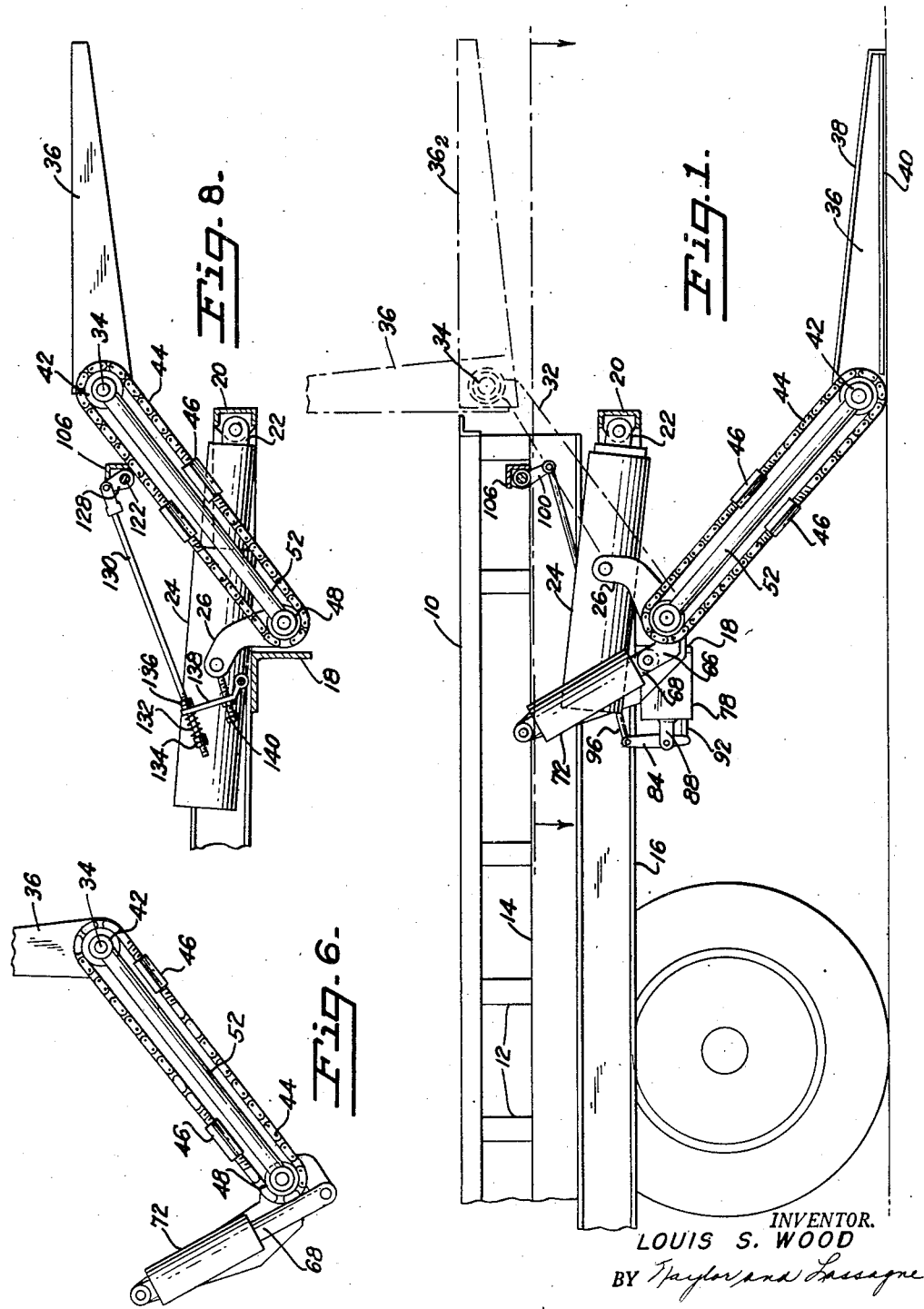
Figure 1 is a view in side elevation, partly in section, of the tail gate mechanism embodied in the invention, with the gate shown at ground level position.
Figure 2:
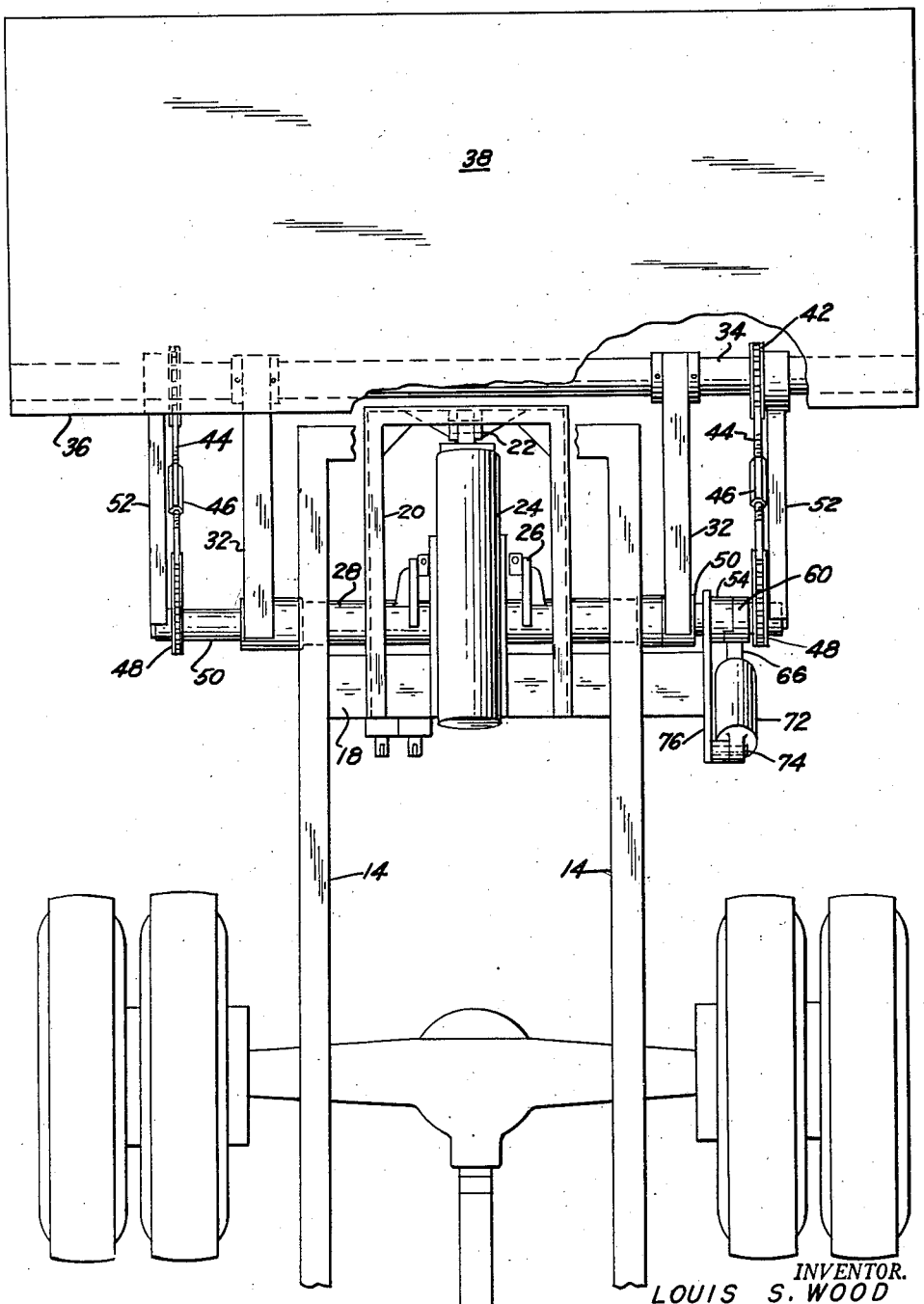
Figure 2 is a plan view of the embodiment of the invention taken substantially along lines, 2—2 of Figure 1.
Figure 3:
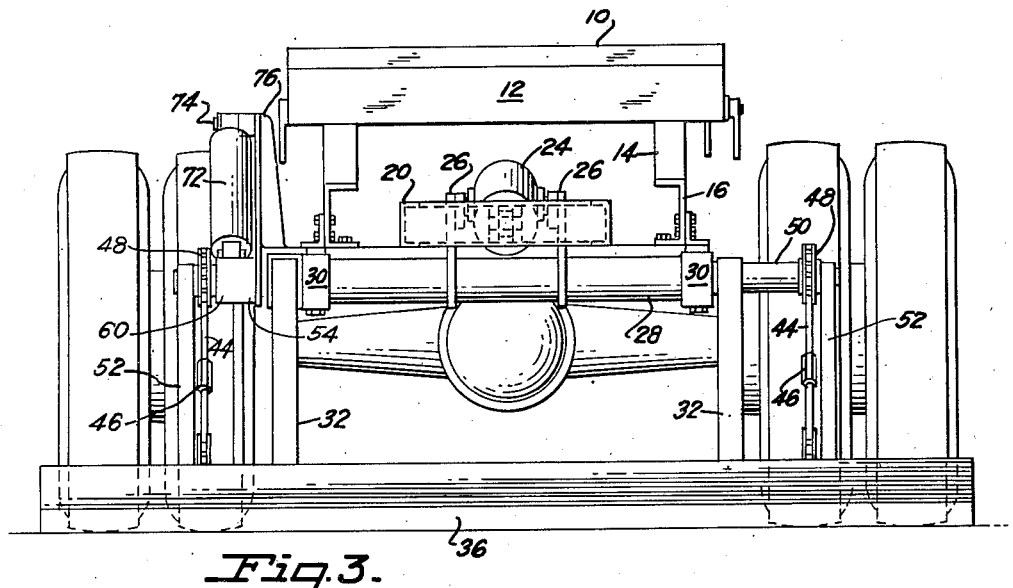
Figure 3 is a view in rear elevation of the structure of Figure 1.

Figures 12 and 13 are plan views showing the characteristics of the clutch structure embodied in the invention; and Figures 14 and 15 are views in section taken, respectively, along lines 14—14 of Figure 12 and lines 15—15 of Figure 13.

Referring to the drawings for more specific details of the invention, 10 indicates the bed of a truck supported by a plurality of transverse members 12 interconnecting a pair of spaced body rails 14, said rails being in turn supported by longitudinal chassis members 16. An angle member 18 is secured transversely of the chassis members 16 at the underside thereof, said member 18 supporting in conjunction with the body rails 14 a box frame 20 having pivotally secured thereto the end of a piston member 22 carried within a movable cylinder 24. The cylinder 24 has pivotally secured thereto a pair of arms 26 fixedly secured at their opposite ends to a tube shaft 28 journalled for support in bearing brackets 30 carried by the angle member 18.

Secured to the tube shaft 28 adjacent the ends thereof are lifting arms 32 having their opposite ends sleeved on a shaft 34 fixedly carried by a tail gate 36 having convergent upper and lower surfaces 38 and 40. At each end of the shaft 34 there is secured a sprocket 42 interconnected by a continuous chain drive 44, having a pair of tension adjusting turnbuckles 46, to sprockets 48 fixedly secured adjacent the ends of a shaft 50 journalled for rotation within the tube shaft 28. Sprockets 48 are slightly smaller in diameter than sprockets 42 for a purpose hereinafter to be described, and a tension arm 52 interconnecting shafts 34 and 50 outwardly of the sprockets 42 and 48 serves the two-fold function of maintaining the spacing between said shafts and preventing the entanglement of clothing, and the like, with the chain drive 44.

A bearing sleeve 54 secured to the angle member 18 serves as a further journal support for the shaft 50, said sleeve having a clutch face comprising an arcuate segment 56 of approximately 135° and a complementary cut away portion 58 of approximately 225°. A clutch member 60 secured to shaft 50 and having an arcuate segment 62 of approximately 135°, extending within the cut away portion 58 of the clutch face of sleeve 54, and a cut away portion 64 of approximately 225° into which the arcuate segment 56 extends, allows for a limited rotational travel of approximately 90° between the shaft 50 and the fixed bearing sleeve 54.

The clutch member 60 has affixed thereto a lever arm 66 having its end pivotally secured to the end of a piston rod 68 connected to a piston 70 slidably carried within a cylinder 72 having the end thereof pivotally secured to an arm 74 of a bracket 76 mounted on the angle member 18.

A hydraulic pump, not shown, adapted to be driven by any desirable means, as by the motor of the truck, is connected to each of a pair of hydraulic valves 78 and 80 supported by the angle member 18, said valve 78 having a hydraulic line 82 providing for communication with the space between piston 70 and cylinder 72 of the hydraulic cylinder connected to shaft 50, and valve 80 having a hydraulic line, not shown, similarly providing for communication with the space between the piston and the cylinder 24 connected to the tube shaft 28.

Each of the valves 78 and 80 is provided with a control mechanism comprising, respectively, first class levers 84 and 86 pivotally secured to fulcrum arms 88 and 90 carried by the valve casings, said levers 84 and 86 having pivotally secured at their lower ends valve selector arms 92 and 94 slidable inwardly of the valves to either of two positions, the most extreme positioning of the arms 92 and 94 resulting from a maximum inward sliding of said arms, being effective to open the valves to connect the cylinders 72 and 24 to the pump, and the intermediate positioning of said arms being effective to disconnect the pump from the cylinders 72 and 24 and maintain a fluid lock within the cylinders. When the levers 84 and 86 are in the vertical position of Figures 1, 5 and 7, the selector arms 92 and 94 are in their fully outward or bypass position, and fluid from the pump passes through the series-connected bypass passageways of valves 78 and 80 to a sump, not shown.

It will be understood that the individual movement of the selector arm 94 to connect the pump with cylinder 24 prevents any passage of fluid to valve 78. Selector arm 92 of valve 78 may be moved inwardly of said valve simultaneously with the similar movement of arm 94, but it is only upon the outward movement of the latter arm to its intermediate, or holding position, that pressurized fluid may pass through the valve 78 to cylinder 72. Thus, only one of the cylinders 24 and 72 may be operated at a time but the operation of both may be caused to be in automatic sequence by a pre-setting, or simultaneous inward movement of the selector arms 92 and 94.

Control arm 96 is pivotally connected at its opposite end to a lever arm 100 keyed, or otherwise secured, to a control shaft 102 journalled for rotation in supports 104 carried by an angle member 106 affixed transversely to the body rails 18. A hand lever 108 is fixed to the outer end of the control shaft 102, while a lever arm 110 secured to shaft 102, is pivotally connected to a rod 112 pivotally connected to a crank arm 114 carried for pivotal movement by the angle member 18. The crank arm 114 has a limit stop arm 116 adapted to be engaged by a lug 118 on shaft 50 upon a predetermined rotation of said shaft for a purpose which will hereinafter appear.

Control arm 98 is pivotally connected to a lever arm 120 keyed, or otherwise secured, to a control shaft 122 journalled for rotation in support members 124 carried by the angle member 106. The shaft 122 has secured to the end thereof a hand lever 126, while a lever arm 128 secured to said shaft is pivotally connected to a rod 130 having a yieldable connection, provided by a spring 132, adjustment nuts 134, and limit nuts 136, with a lever arm 138 pivotally carried by angle member 18. An adjustable abutment screw 140 carried by the arm 138 is adapted to be contacted by one of the arms 26 connected to the cylinder 24 upon a predetermined travel of said cylinder for a purpose which will hereinafter appear.

Latch members 142 sleeved on control shaft 122 for freely swinging movement have in association therewith limit members 144 secured for movement with shaft 122, said members 144 having adjustable abutment screws 146 adapted to carry the latch members 142 therewith upon a rotation of shaft 122 in one direction. The lifting arms 32 are provided with lugs 148 which, upon the upward rotational movement of said arms in a manner hereinafter more fully described, urge the latch members 142 outwardly of their path of travel by contact with the cam faces of said latch members, whereupon, after passage of the lugs 148 therepast, the latch members fall downwardly into contact with said lugs, as shown in Figure 9, with no load normally being carried by said latch members due to the spacing 150 between the lugs 148 and the teeth of said latch members. Latch members 142, therefore, merely serve as a safety catch in case the arms 32 should drop downwardly due to a mishap.

Figure 4:
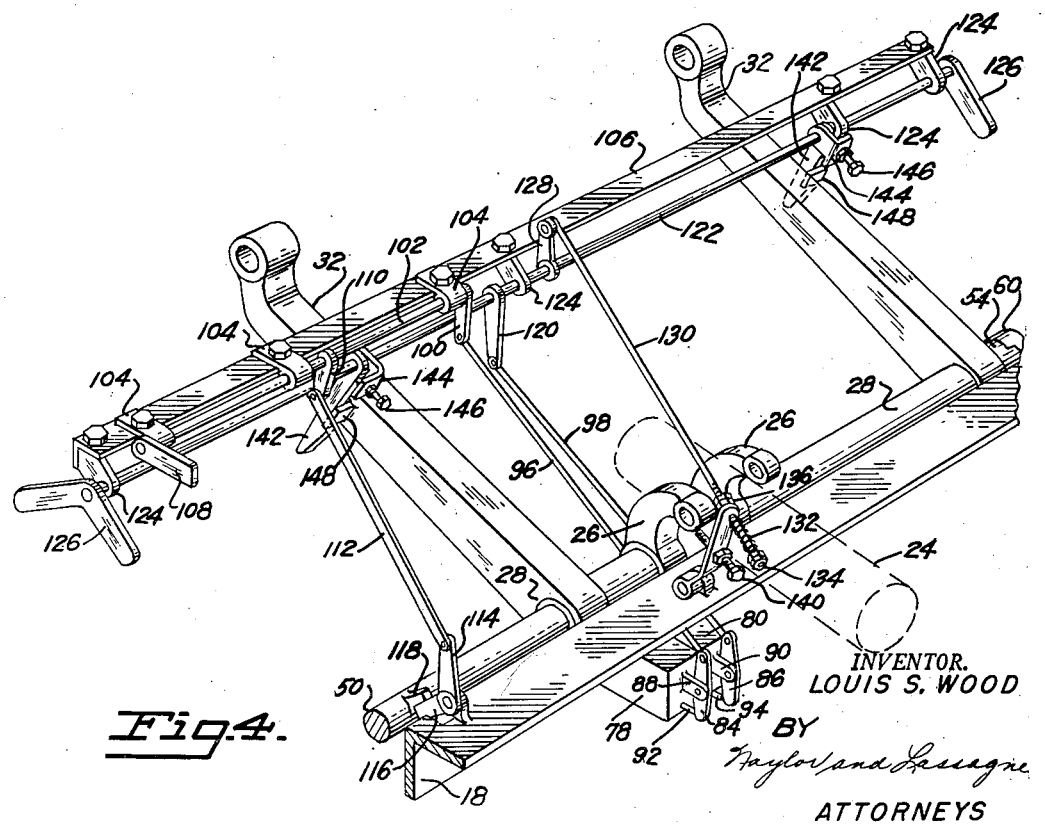
Figure 4 is a detailed view in perspective of the control system embodied in the invention.

With the tailgate 36 resting on the ground, as shown in Figure 1, with the surface 38 angularly inclined, as shown, to serve as a rampway for the facile rolling or sliding of heavy articles onto the tailgate, in which position the segments 56 and 62 of the clutch members 54 and 60 are in the contactual engagement position of Figures 13 and 15, the operation of the mechanism to raise the tailgate from the ground position through the dotted line position indicated by 36 in Figure 1 to the dotted line position of 36₂ is as follows. The hand lever 126, at the left in Figure 4, is moved in a counter-clockwise direction to impart rotation in that direction to control shaft 122, thus moving stop members 144 a predetermined degree to allow the limit members to gravitate in a counter-clockwise direction into the path of lugs 148. Upon the movement of shaft 122 in this manner, lever arm 120 moves control arm 98 to the right to rock lever arm 86 in a clockwise direction and move selector arm 94 fully inward of valve 80 to allow pressurized fluid to pass through said valve into the cylinder 24. At the same time, the movement of shaft 122 is effective to move lever 128 in a counter-clockwise direction to move rod 130 to the left to also move abutment screw 140 to the left into the end of the path of travel of the arm 26 attached to the cylinder 24.

As pressurized fluid enters cylinder 24, the piston remains stationary while the cylinder moves upwardly to the left, as viewed in Figure 1 to rotate arms 26 in a counter-clockwise direction, thus causing tube shaft 28 and lifting arms 32 to rotate in the same direction to raise the tailgate 36. As the tailgate rises, the reaction of the weight of the gate transmitted through the sprockets 42, chain drive 44, and sprockets 48 tends to rotate shaft 50 in a clockwise direction, as viewed in Figure 1, but the contact between segments 56 and 62, the latter being carried by shaft 50, as viewed in Figure 15, prevents such movement of the shaft.

As the tailgate is raised by the lifting arms 32, the chain 44 maintains parallelism of the gate with the ground, but, due to the slightly greater size of sprockets 42 over sprockets 48, the surface 38 of the gate is shifted from its slight angularity with the ground to parallelism therewith, as shown in dotted outline 36 of Figure 1. This is further indicated by the difference in position of the turnbuckles 46 in Figure 8, as compared to their position in Figure 1. Other than this slight walking movement of the chain 44, the chain is relatively immobile with respect to the sprockets 42 and 48 during the lifting of the tailgate to the raised horizontal position of 36.

When the gate 36 reaches the raised horizontal position of 36, with the surface 38 in alignment with the bed 10 of the truck, the arm 26 has been sufficiently moved in a counter-clockwise direction, as seen in Figure 8, to strike the abutment screw 140 and to yieldingly move rod 130 to the left in Figure 8, thus rotating shaft 122 counter-clockwise in Figure 8, or clockwise in Figure 4 to a lesser degree than the initial contra-rotation of said shaft to cause a withdrawal of selector arm 94 from valve 80 to the intermediate, or holding, position. This outward movement of arm 94 is effective to shut off the flow of fluid to cylinder 24 and maintain said cylinder in its extended position.

Meanwhile, the lugs 148 on arms 32 have brushed the limit members 142 aside in passing, and the lugs 148, members 142 and gate 36 have come to rest in the position of Figure 9. Due to the spacing 150 between the lugs 148 and teeth of the members 142, the members are not supporting the weight of the arms 32 and gate, thus allowing an easy rotation of control shaft 122 when the hand lever 126 is next turned. However, if there should be some failure to the mechanism which would ordinarily allow the arms 32 and gate to fall, the limit members 142 will prevent such downward movement of the arms.

When the hand lever 126 was originally rotated, the hand lever 108 could have been simultaneously turned to allow the valves 80 and 78 to operate the cylinders 24 and 72 in sequence, as hereinabove mentioned. However, the hand lever 108 may be operated separately after the valve 80 has been shut off from communication with the cylinder 24. A rotation of lever 108 a predetermined degree in a counter-clockwise direction, as viewed in Figure 4, is effective to rotate shaft 102 to move rods 96 and 112 to the right to move selector arm 92 fully inwardly of valve 78 and to move the limit stop arm 116 of crank arm 114 to the left into the path of lug 118 on shaft 50. When the selector arm 92 is moved inwardly of the valve 78, pressurized fluid passes through said valve into the cylinder 72 to move the piston 70 downwardly, as viewed in Figure 5, to rotate shaft 50 counter-clockwise through the arm 66, thus rotating sprockets 48 in the same direction and rotating sprockets 42 in counter-clockwise movement. The rotation of shafts 50 and 34 is limited to approximately 90°, or until the clutch segment 62 carried by shaft 50 travels from the position of Figure 15 to that of Figure 14. The 90° rotation of shaft 34 is effective to raise gate 36 to the vertical position of $36_2$ in Figure 1. When the gate reaches this position, the lug 118 on shaft 50 moves the limit stop arm 116 to the right, as viewed in Figure 4, to move rod 112 to the left, thus rotating shaft 102 in a clockwise direction to a lesser degree than the initial contra-rotation of said shaft to move selector arm 92 outwardly of valve 78 to its intermediate, or holding, position to shut off fluid flow to cylinder 72 and maintain the fluid pressure in the cylinder.

To lower the gate 36 from the position $36_2$ to the position $36_1$, it is only necessary to rotate hand lever 108 in a clockwise direction, as viewed in Figure 4, to restore said lever to its initial position, thus moving control arm 96 to the left and withdrawing selector arm 92 outwardly of the valve to its bypass position, whereupon the fluid lock in cylinder 72 is released and a dash-pot action is set up as the weight of the gate 36 in moving towards a horizontal position causes sprockets 42, chain 44, sprockets 48 and shaft 50 to rotate in a clockwise direction, as viewed in Figure 1, to force the fluid from cylinder 72 by the resultant inward movement of piston 70 within the cylinder. When the clutch segment 62 reaches the position shown in Figure 15, the gate is in the position of 36, and further rotational movement of the gate is halted.

To bring the gate 36 to the ground position of Figure 1 from the position of $36_1$, hand lever 126 is rotated in a clockwise direction, as viewed in Figure 4, to restore said lever to its initial position, thus moving control arm 98 to the left and withdrawing selector arm 94 outwardly of the valve 80 to its bypass position, whereupon the fluid lock in cylinder 24 is released and a dash-pot action is set up as the gate in moving towards a ground position pivots the lifting arms 32 downwardly to rotate tube shaft 28 and arms 26 to force the fluid from cylinder 24.

It is, of course, possible to lower the gate 36 from its position of $36_2$ to the ground position by simultaneously rotating hand levers 108 and 126, thus allowing a concurrent rotation of shaft 50 and tube shaft 28, rather than a sequential rotation, as described.

While the preferred embodiment of the invention has been shown and described, it is to be understood that this embodiment is subject to modification within the spirit of the invention and the scope of the appended claims.

What I claim as new and desire to secure by Letters Patent is:

1. A power operated tail gate for a vehicle body, comprising a platform, a first shaft and a second shaft concentrically arranged and carried for rotation by said body, at least one lifting arm having a fixed connection with said first shaft and a pivotal connection with said platform adapted to raise said platform upon the rotation of said first shaft, means comprising an interconnection between the second shaft and the platform adapted in one phase of operation to serve as a reaction member to maintain substantial parallelism between said platform and the ground during rotation of said first shaft and in another phase of operation to translate rotational movement of said second shaft to a rotational movement of said platform about its axis of pivot with the lifting arm, and power means carried by the body to separately rotate said shafts.

2. The combination as set forth in claim 1, wherein the interconnection between said second shaft and said platform comprises a sprocket fixedly secured to said second shaft, a sprocket fixedly secured to said platform concentric with the pivotal axis thereof, and a continuous chain drive passing over said sprockets.

3. The combination as set forth in claim 2, wherein complementary clutch members carried by the body and the second shaft coact during upward movement of the lifting arm to prevent rotation of said second shaft tending to be caused by the weight of the platform.

4. The combination as set forth in claim 3, wherein the platform has convergent upper and lower surfaces adapting said platform as a rampway when the lower surface thereof is on the ground, and wherein the sprocket secured to said platform is of a larger diameter than the sprocket secured to the second shaft, said differential in sprocket size being adapted to shift the platform during upward movement of the lifting arm so that the upper surface of the platform is parallel to the truck body bed at bed level.

5. The combination as set forth in claim 1, wherein complementary clutch members carried by the body and the second shaft coact during upward movement of the lifting arm to prevent rotation of said second shaft tending to be caused by the weight of the platform.

6. A power operated tail gate for a vehicle body, comprising a platform, a first shaft and a second shaft concentrically arranged and carried for rotation by said body, at least one lifting arm having one end secured to said first shaft and the other end pivotally attached to said platform, means interconnecting the second shaft and said platform and adapted to translate the rotational movement of said second shaft to rotational movement of said platform about its axis of pivot with the lifting arm, means carried by the body and having a connection with said first shaft adapted to rotate said shaft to raise said lifting arm, means comprising complementary clutch members carried by said second shaft and said body adapted to prevent rotation of said shaft during raising movement of said lifting arm, and means carried by the body and connected to said second shaft adapted to rotate said shaft to pivot said platform.

7. A power operated tail gate as set forth in claim 6, wherein the means interconnecting the second shaft and the platform is attached to the latter concentric with the axis of pivot between the lifting arm and the platform.

8. For a power operated tail gate adapted to be raised in an arcuate path from ground level to truck bed level about a lifting axis in substantial parallelism with the ground and adapted to be pivoted from truck bed level to an upstanding vertical position about a hinge axis, means comprising a continuous belt connection between said hinge axis and said lifting axis adapted to serve as a reaction member to maintain said parallelism during the raising of the gate and adapted to pivot said gate to a vertical position following the raising thereof.

9. For a power operated tail gate having a lifting member mounted for rotative movement on a truck body and connected to said tail gate for the raising thereof, the combination of a rod pivotally carried by the body, a latch member freely mounted on said rod having a cam face, a lug on said lifting member adapted to engage said cam face during the rotative movement in one direction of said lifting member to displace said latch member from the arcuate path of said lug to allow the passage thereby of lug, said latch member being adapted to gravitate into the path of said lug following said passage, a surface on said latch member normally spaced from said lug and adapted to engage said lug to support said lifting member upon the accidental reverse rotative movement of said member, and means forming a one-way connection between said latch member and said rod adapted to pivot said latch member out of the path of the lug upon rotation of said rod.

10. For a power operated tail gate mechanism mounted on a truck body frame and comprising a rotatable shaft, a hydraulic cylinder adapted to rotate said shaft, and a hydraulic valve connected into a fluid circuit between a pump and said cylinder, a control system comprising a rotatable control shaft carried by the frame, a linkage connection between said control shaft and valve adapted upon the rotation of said control shaft in one direction to pass fluid from said valve to said cylinder to rotate said first shaft, a member carried by said first shaft and rotatable therewith, a linkage connection between said control shaft and said frame including a rockable member adapted to enter the path of said shaft member upon said rotation of said control shaft, said second linkage connection being adapted to reversely rotate said control shaft to close said valve to said cylinder upon the movement of said rockable member by said shaft member.

LOUIS S. WOOD.

REFERENCES CITED

The following references are of record in the file of this patent:

UNITED STATES PATENTS

| Number | Name | Date |
|---|---|---|
| 1,861,556 | Smith et al. | June 7, 1932 |
| 2,099,998 | Berg | Nov. 23, 1937 |
| 2,348,993 | Novotney | May 16, 1944 |
| 2,350,641 | Ruddock | June 6, 1944 |
| 2,389,221 | Wachter | Nov. 20, 1945 |
| 2,390,268 | Penney | Dec. 4, 1945 |
| 2,391,813 | Wood | Dec. 25, 1945 |

FOREIGN PATENTS

| Number | Country | Date |
|---|---|---|
| 632,041 | Germany | July 2, 1936 |